July 27, 1937.     J. HALADA     2,088,517
MEASURING DEVICE
Filed Oct. 8, 1936     4 Sheets-Sheet 1
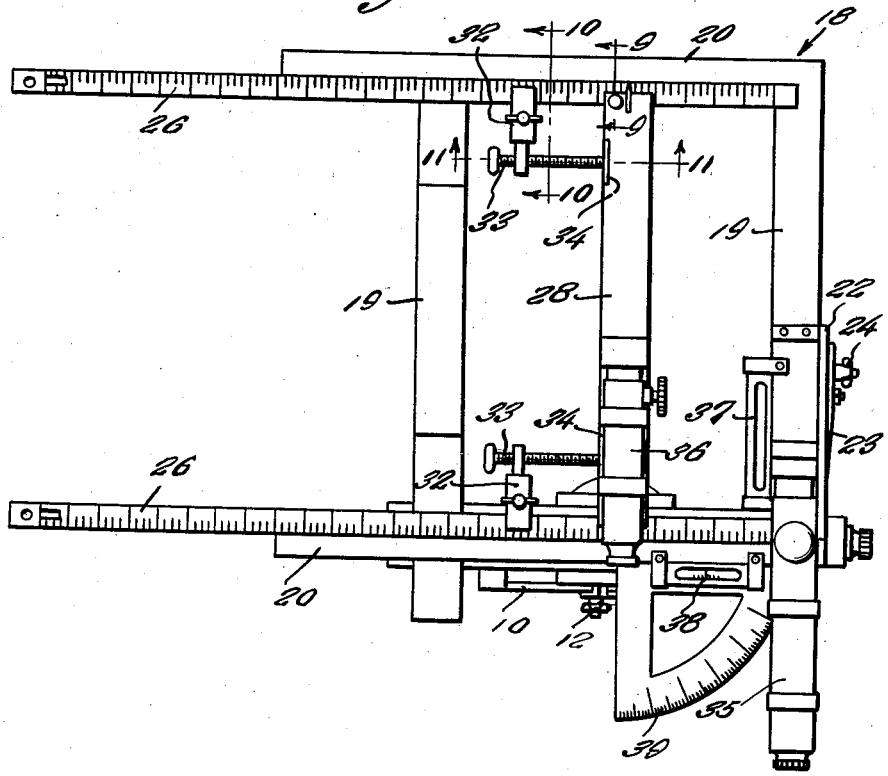
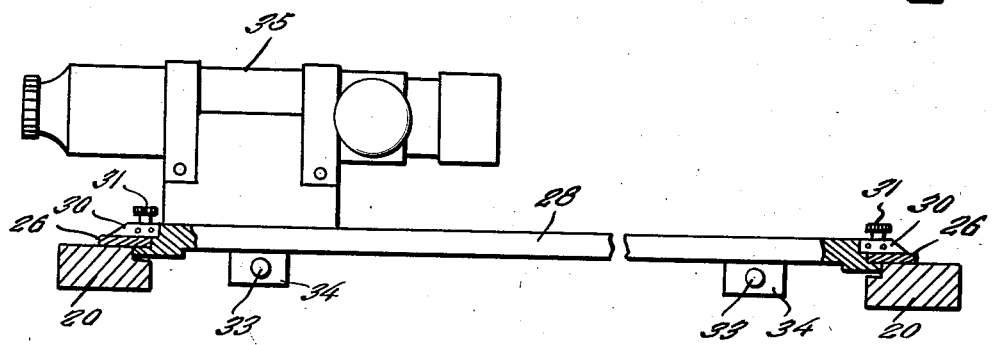
Inventor
John Halada
By Clarence A. O'Brien
Hyman Berman
Attorneys July 27, 1937.  J. HALADA  2,088,517
MEASURING DEVICE
Filed Oct. 8, 1936  4 Sheets—Sheet 2

Inventor
John Halada
By Clarence A O'Brien
Hyman Berman
Attorneys

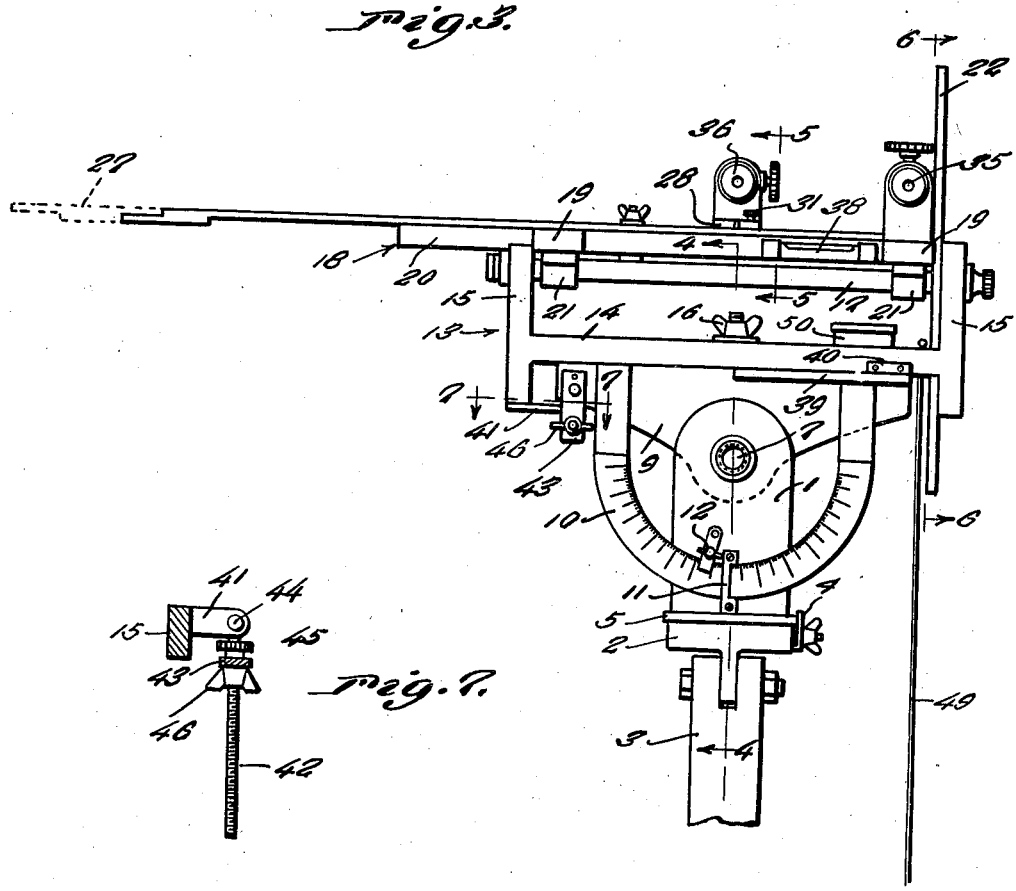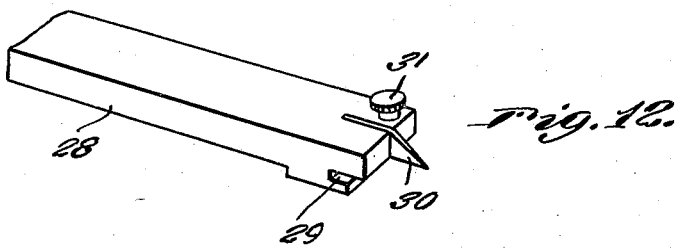

July 27, 1937.  J. HALADA  2,088,517
MEASURING DEVICE
Filed Oct. 8, 1936  4 Sheets-Sheet 4
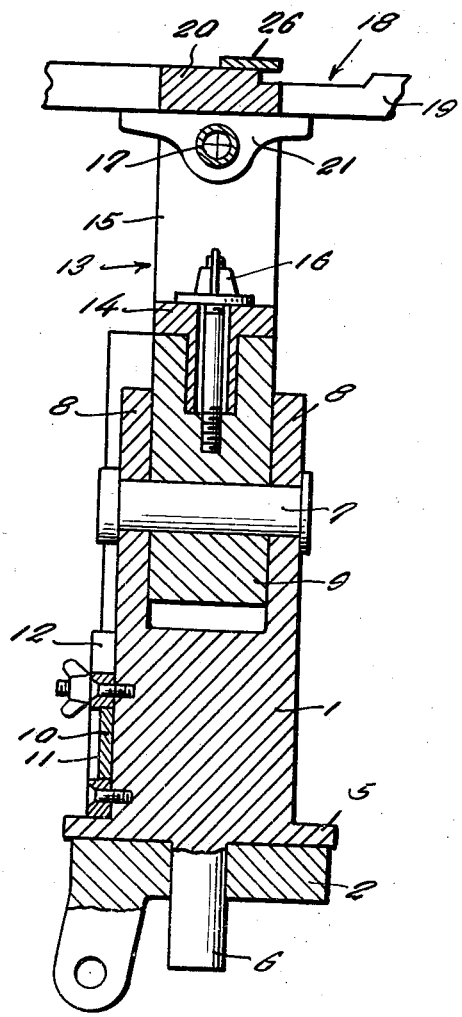
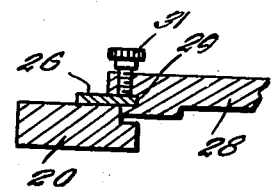
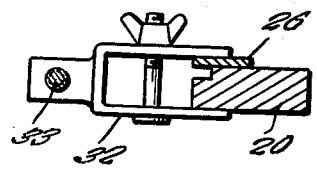
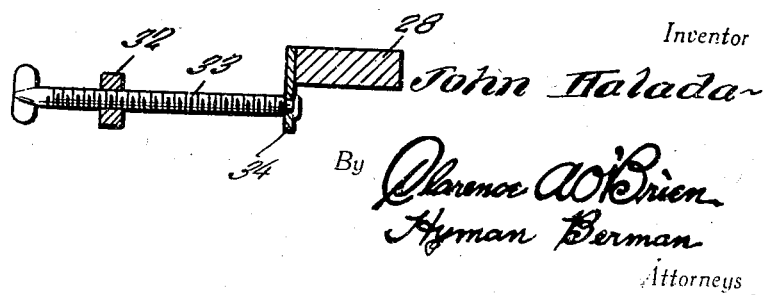
Inventor
John Halada
By Clarence A. O'Brien
Hyman Berman
Attorneys Patented July 27, 1937

2,088,517

UNITED STATES PATENT OFFICE 2,088,517

MEASURING DEVICE

John Halada, Long Lake, Wis.

Application October 8, 1936, Serial No. 104,695

1 Claim. (Cl. 33—65)

The present invention relates to new and useful improvements in measuring devices and has for one of its important objects to provide, in a manner as hereinafter set forth, an instrument of this character embodying a novel construction, combination and arrangement of parts through the medium of which the distance of a remote object or point may be rapidly and accurately ascertained.

Another very important object of the invention is to provide a measuring device of the character described embodying means through the medium of which the distance between two objects located at remote points may be ascertained.

Still another very important object of the invention is to provide, in a manner as hereinafter set forth, a measuring device through the medium of which the altitude of remotely located objects or points may be computed.

Other objects and advantages of the invention will become apparent from a study of the following specification, taken in connection with the accompanying drawings wherein like characters of reference designate corresponding parts throughout the several views, and wherein:—

Figure 1 is a top plan view of a measuring device constructed in accordance with the present invention.

Figure 2 is a view in side elevation thereof.

Figure 3 is a rear elevational view.

Figure 4 is a vertical sectional view, taken substantially on the line 4—4 of Figure 3.

Figure 5 is a view in vertical section through an upper portion of the device, taken substantially on the line 5—5 of Figure 3.

Figure 6 is a vertical sectional view, taken substantially on the line 6—6 of Figure 3.

Figure 7 is a detail view in horizontal section, taken substantially on the line 7—7 of Figure 3.

Figure 8 is a horizontal sectional view, taken substantially on the line 8—8 of Figure 2.

Figure 9 is a detail view in vertical section, taken substantially on the line 9—9 of Figure 1.

Figure 10 is a detail view in vertical section, taken substantially on the line 10—10 of Figure 1.

Figure 11 is a detail view in vertical section, taken substantially on the line 11—11 of Figure 1.

Figure 12 is a detail view in perspective of an end portion of the laterally slidable member.

Referring now to the drawings in detail, it will be seen that the embodiment of the invention which has been illustrated comprises a bifurcated base 1 of suitable material which is rotatably mounted on the head 2 of a suitable tripod or stand 3. A clamp 4 is provided for securing the base 1 in the desired position, said clamp being engageable with a flange 5 on the lower end of said base. A trunnion 6 depends from the lower end of the base 1 and is journaled in the tripod head 2.

A suitable pin 7 (see Figure 4) extends between the bifurcations 8 of the base 1 and journaled thereon for swinging movement in a vertical plane is a cross-head 9. The cross-head 9, it will be noted, is disposed transversely and depending from said cross-head is a substantially U-shaped scale 10 which travels in a combined sight and guide 11 on the base 1. A clamp 12 is mounted on the base 1 and engageable with the scale 10 for securing the cross-head 9 in adjusted position.

Mounted for rotary adjustment in a horizontal plane on the cross-head 9 is a substantially H-shaped supporting structure which is designated generally by the reference numeral 13, said supporting structure including a horizontal bar 14 on the ends of which vertical posts 15 are provided. The bar 14 is secured for rotary adjustment on the cross-head 9 at 16 (see Figures 3 and 4). Extending between the vertical posts 15 of the supporting structure 13 is a telescope 17. Mounted for swinging adjustment in a vertical plane on the telescope 17 is a horizontal frame which is designated generally by the reference numeral 18. The frame 18 comprises longitudinal and transverse bars 19 and 20, respectively. Bearings 21 (see Figure 4) are secured beneath the bars 19 and journaled on the telescope 17. Fixed on one end portion of the supporting structure 13 is an arcuate scale 22. An arm 23 is mounted on the telescope 17 and extends adjacent the scale 22, said arm being provided with a clamp 24 on its free end portion which is engageable with said scale 22 for securing said arm thereto in adjusted position. Also mounted on the arm 23 is a set screw 25 which is engaged beneath the adjacent bar 19 of the frame 18 and through the medium of which fine adjustments of said frame 18 may be had.

Mounted on the transverse bars 20 of the frame 18 are spaced, parallel scales 26. The scales 26 project laterally beyond the frame 18 on one side and the outer ends thereof are suitably constructed to facilitate the attachment of extensions 27 if desired. Slidably mounted for lateral adjustment on the scales 26 is a bar 28 having grooves 29 in its ends accommodating said scales. Pointers 30 project from the ends of the adjustable bar 28 over the scales 26. Set screws 31 are provided in the end portions of the bar 28 and engageable with the scales 26 for releasably securing said bar in adjusted position. The reference numeral 32 designates clamps which are detachably secured on the bars 20 and the scales 26 in the manner shown to advantage in Figure 10 of the drawings. Threadedly mounted for adjustment on the clamps 32 are screws 33 which are rotatably secured to the end portions of the adjustable bar 28, as at 34 (see Figure 11). Telescopes 35 and 36 are mounted on the right hand bar 19 and the adjustable bar 28, respectively. The reference numerals 37 and 38 designate, respectively, longitudinal and transverse levels which are mounted on the frame 18.

Mounted horizontally on an upper portion of the cross-head 9 is a segmental scale 39. A sight plate 40 is provided on the bar 14 of the structure 13 to facilitate reading the scale 39 for ascertaining the adjustment of said structure 13. Of course, the connection 16 is loosened to permit rotary adjustment of the structure 13. Referring now to Figures 3 and 7 of the drawings, it will be seen that an arm 41 extends inwardly in a horizontal plane from the lower end of one of the posts 15. Pivotally mounted in the inner end portion of the arm 41 is a screw 42 which is adapted for slidable insertion through a bracket 43 which depends from one end portion of the cross-head 9. The screw 42 includes an upturned end portion 44 which is journaled in the arm 41. Thumb nuts 45 and 46 are provided on the screw 42 on opposite sides of the bracket 43 for adjusting the structure 13. It may be well to here state that the elements 41 to 46, inclusive, are used to permit fine adjustments of the structure 13 to be had. The reference numeral 47 designates a level on the lower portion of the base 1.

It is thought that the manner of using the instrument will be readily apparent from a consideration of the foregoing, particularly to those skilled in the art to which the invention pertains. To ascertain the distance of an object the telescope 35 is first focused thereon. The telescope 36 is then adjusted laterally through the medium of the screws 33 and focused on the object. Of course, with the telescope 36 focused on the objest said telescope 36 does not parallel the telescope 35 and the angle thereof may be ascertained by consulting the scales 26. With the telescopes 35 and 36 focused on the object and adjusted as above described the distance of said object may be readily ascertained in the usual manner by triangulation. To ascertain the distance between two remote objects, the distance of each object from the location of the instrument is first found. The telescope 35 is then trained on one of the objects and the instrument is then swung on the pivotal connection 16 to bring the telescope 35 to the other of said objects. Then, by observing the scale 39 the distance between the two objects may be computed. The altitude of an object may be ascertained by swinging the frame 18 in a horizontal plane on the telescope 17 and observing the scale 22. If it is desired to also ascertain the altitude of a laterally disposed object while retaining the adjustment of the frame 18, this may be accomplished by swinging the cross-head 9 on its pivot 7 for permitting the telescope 17 to be trained on said laterally disposed object, the scale 10 being consulted for computing the altitude thereof. Of course, rotation of the entire instrument on the tripod 3 may be accomplished by simply loosening the clamp 4.

To ascertain the altitude of an object or objects it is first necessary to find the distance of said object or objects from the instrument, as when getting the distance between two remote objects. The reference numeral 49 designates a plumb line suspended from the supporting structure 13 and a compass on the bar 14 of said structure 13 is indicated at 50.

What is claimed is:—

A measuring device of the class described comprising a substantially horizontal frame including longitudinal and transverse bars, spaced, parallel scales mounted on the transverse bars in parallelism therewith, a telescope mounted on one of the longitudinal bars, a laterally adjustable bar extending between the scales and slidably mounted thereon, pointers on the ends of the last named bar for cooperation with the scales, substantially U-shaped clamps detachably mounted on the frame adjacent the ends of the last-named bar, and manually operable screws threadedly mounted in the clamps and rotatably connected to the last-named bar for adjusting the same.

JOHN HALADA.